(12) United States Patent  
Macbeth

(10) Patent No.: US 6,590,754 B1
(45) Date of Patent: Jul. 8, 2003

(54) AFCI WITH FALSE TRIP PREVENTION FILTER

(75) Inventor: Bruce F. Macbeth, Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

(21) Appl. No.: 09/990,839

(22) Filed: Nov. 16, 2001

Related U.S. Application Data

(60) Provisional application No. 60/249,481, filed on Nov. 17, 2000.

(51) Int. Cl.[7] ................................................ H02H 3/00
(52) U.S. Cl. .......................................... 361/42; 324/536
(58) Field of Search ............................ 361/42, 54, 93, 361/170; 324/536, 508, 509

(56) References Cited

U.S. PATENT DOCUMENTS 5,839,092 A  * 11/1998  Erger et al. .................... 702/58

6,362,628 B2 *  3/2002  Macbeth et al. ............. 324/536

* cited by examiner

*Primary Examiner*—Brian Sircus
*Assistant Examiner*—Boris Benenson
(74) *Attorney, Agent, or Firm*—Wall Marjama & Bilinski LLP

(57) ABSTRACT

An AFCI looks for a variation in the number of load current step pulses, i.e., di/dt pulses, occurring in a succession of power line intervals. A number of di/dt pulses occurring during one cycle of the power wave is compared to a number of di/dt pulses occurring in a subsequent cycle of the power wave. The AFCI activates when the number of times that the di/dt count varies from line cycle to subsequent line cycle exceeds a predetermined number within a predetermined number of line cycles. A counting window within each line cycle preferably extends from approximately 150 degrees after the start of the first half wave cycle to approximately 30 degrees after the start of the following half wave cycle, thereby placing the counting window in the band where light dimmers typically are not designed to operate.

32 Claims, 3 Drawing Sheets

AFCI WITH FALSE TRIP PREVENTION FILTER

CROSS-REFERENCE TO RELATED APPLICATIONS

This application claims priority from U.S. Provisional Application Ser. No. 60/249,481 filed Nov. 17, 2000 and entitled AFCI WITH FALSE TRIP PREVENTION FILTER, incorporated herein by reference.

FIELD OF THE INVENTION

This invention relates generally to the field of arc fault detectors, and more particularly to an arc fault detector with a filter which prevents false tripping due to dimmer switches.

BACKGROUND OF THE INVENTION

Arc faults are always accompanied by steps in arc current as the arc strikes, continues, and extinguishes. These steps in current, when differentiated, produce di/dt pulses. Other loads, such as light dimmers, also produce steps in current and the associated di/dt when the dimmer triac switches into conduction. Any current sensor which detects di/dt in the load current waveform responds to both the step in current from an arc fault as well as the step in current from a light dimmer. Arc detectors which are designed to detect series arc faults, which are limited by the load, must by nature be sensitive to low current in the normal load range where loads such as light dimmers can produce arc fault mimicking di/dt.

SUMMARY OF THE INVENTION

Briefly stated, an AFCI looks for a variation in the number of load current step pulses, i.e., di/dt pulses, occurring in a succession of power line intervals. A number of di/dt pulses occurring during one cycle of the power wave is compared to a number of di/dt pulses occurring in a subsequent cycle of the power wave. The AFCI activates when the number of times that the di/dt count varies from line cycle to subsequent line cycle exceeds a predetermined number within a predetermined number of line cycles. A counting window within each line cycle preferably extends from approximately 150 degrees after the start of the first half wave cycle to approximately 30 degrees after the start of the following half wave cycle, thereby placing the counting window in the band where light dimmers typically are not designed to operate.

According to an embodiment of the invention, an arc fault protection device protecting a circuit on a power line includes means for detecting di/dt pulses of load current steps, in which a first number of di/dt pulses occurring during a specified interval of a power wave is compared to a second number of di/dt pulses occurring in a subsequent interval of the power wave; and means for interrupting the circuit when a third number of times that the first number differs from the second number exceeds a first determined number in a window consisting of a second determined number of specified intervals of the power wave.

According to an embodiment of the invention, a method for protecting a circuit on a power line includes the steps of (a) detecting di/dt pulses of load current steps; (b) comparing a first number of di/dt pulses occurring during a specified interval of a power wave to a second number of di/dt pulses occurring in a subsequent interval of the power wave; and (c) interrupting the circuit when a third number of times that the first number differs from the second number exceeds a first determined number in a window consisting of a second determined number of specified intervals of the power wave.

DETAILED DESCRIPTION OF THE PREFERRED EMBODIMENT

Figure 1:
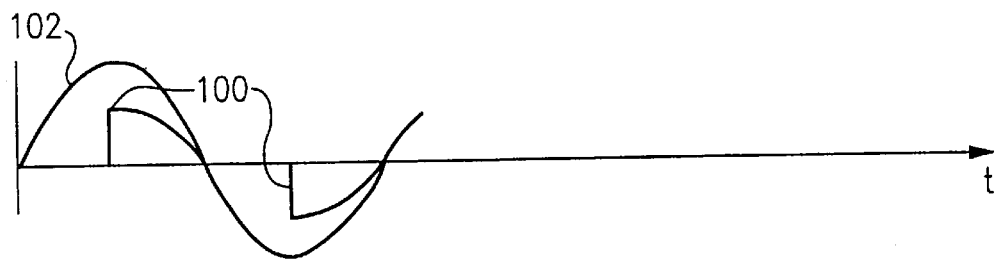
FIG. 1 shows two waveforms used in explaining an embodiment of the invention.
Figure 2:
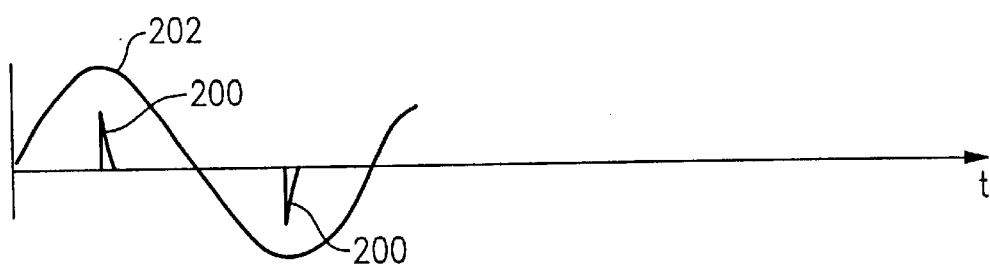
FIG. 2 shows two waveforms used in explaining an embodiment of the invention.
Figure 3:
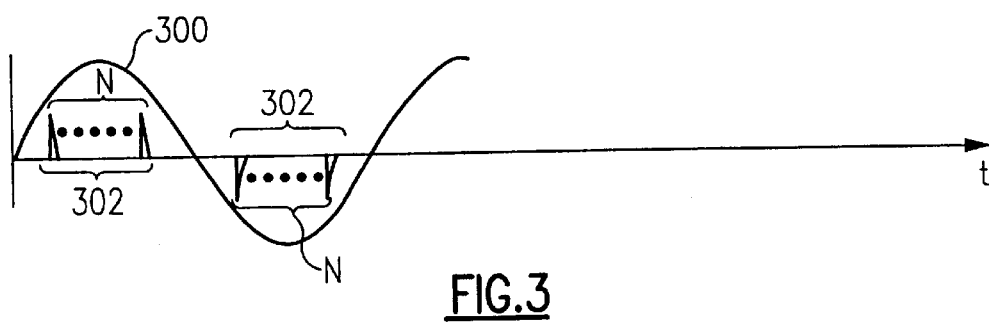
FIG. 3 shows two waveforms used in explaining an embodiment of the invention.

Referring to FIG. 1, the normal line voltage is shown at 102. Also shown are steps 100 in the current produced from a light dimmer. FIG. 2 shows pulses 200 which are produced when the dimmer current shown in FIG. 1 is differentiated, and is referenced to the power line voltage sine wave 202. FIG. 3 shows the power line voltage sine wave 300 in the presence of di/dt pulses 302 from "N" light dimmers. In each case, the number of pulses produced by the "N" number of dimmers is constant in each subsequent power half wave. That is, the number of pulses in the positive half wave is equal to the number of pulses in the negative half wave.

This invention counts the "N" number of di/dt pulses in each power line half cycle and compares the count to the previous half cycle. If any variation in the "N" count number from half cycle to half cycle occurs, such as would occur with random di/dt occurring from an arc fault, a second counter is incremented. If the second counter increments to a predetermined value "M" in a window of a predetermined number of power line half cycles "O", the AFCI is activated, thereby interrupting the arc fault. At the end of the window of predetermined power line half cycles, the second counter is reset to zero and the process then restarts on the following power half wave. Alternately the second counter is incremented in a predetermined ratio to the difference in the "N" count from half cycle to half cycle so that a powerful arc fault with many random di/dt events during a power line half wave can be set to activate the AFCI in a much faster mode.

Figure 4:
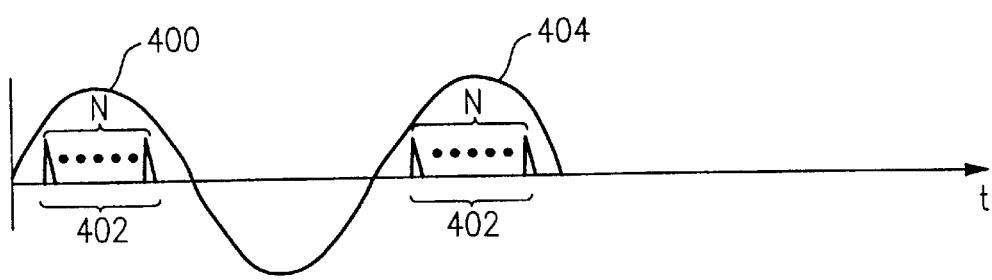
FIG. 4 shows two waveforms used in explaining an embodiment of the invention.

Referring to FIG. 4, in an alternate detection mode, the "N" number of di/dt pulse 402 occurring during a positive power line half wave 404, is compared to a "N" count in a previous positive half wave 400, and any difference increments a second counter as described above. At the same time, any difference in the "N" count from the negative half cycle to the subsequent negative half cycle is also used to increment the second counter. If the second counter reaches a predetermined value in a predetermined number of power line half cycles, the AFCI is activated. The same method of incrementing the second counter quickly in the presence of a large difference in "N" from one polarity half wave to another can also be implemented as described above. This method prevents false tripping from a load such as a dimmer controlled with an SCR, because the SCR only produces di/dt in either the positive or negative half cycle, but not both. The second counter predetermined value "M", in both of the above detection modes, is set so that random di/dt events over intervals much greater than the half cycle window interval "O", such as caused by switch closures and the like, never increment the second counter to the AFCI trip value before the window "O" expires and the second counter is reset.

An alternate method counts the di/dt pulses over an entire line cycle and compares the count to a subsequent entire line cycle count, and using the methods of processing the difference in di/dt counts "N" as described above.

Figure 5A:
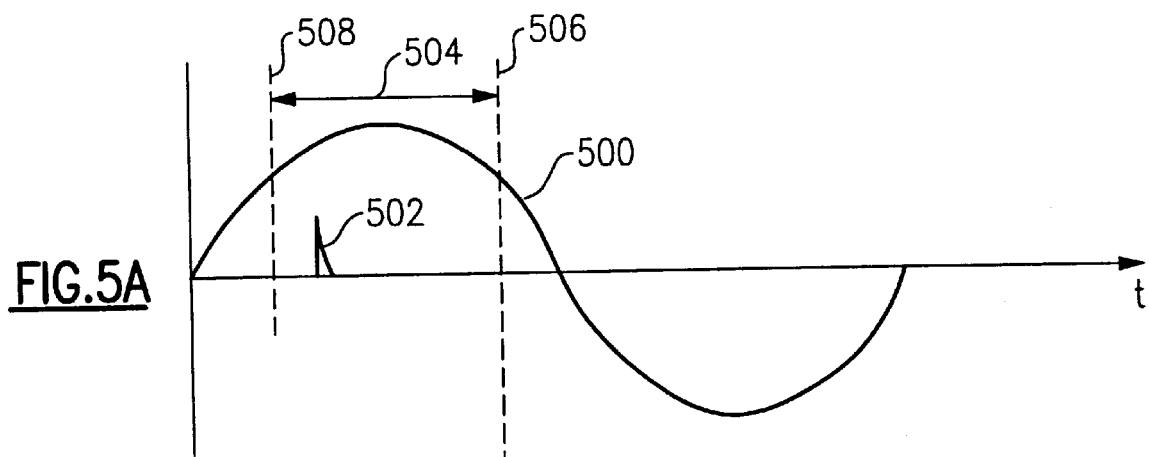
FIG. 5A shows two waveforms used in explaining an embodiment of the invention.

Referring to FIG. 5A, in still another alternate of the method for determining a random difference "N" of di/dt between power line half cycles, the detector is set to accept di/dt only during the time band during the power half wave when the dimmer di/dt does not exist. A power sine wave 500 is shown with a dimmer di/dt pulse 502. A band 504 shows a typical dimmer conduction angle control range. A limit 506 is set by manufacturers because of the intermittent nature of the dimmer trigger when activated by the long RC time constant required by the dimmer to delay the firing point of the device. A limit 508 is set by manufacturers to limit the inrush currents to the dimmer trigger RC time constant when the R of the user variable potentiometer (POT) must be set low, because at the low setting, the inrush currents feeding the C through the R damage the POT. In addition, heat dissipation in a dimmer which is set to near full on becomes excessive, requiring a larger device heat sink, even though the greater light output of the dimmer is hardly noticeable to the user.

Figure 5B:
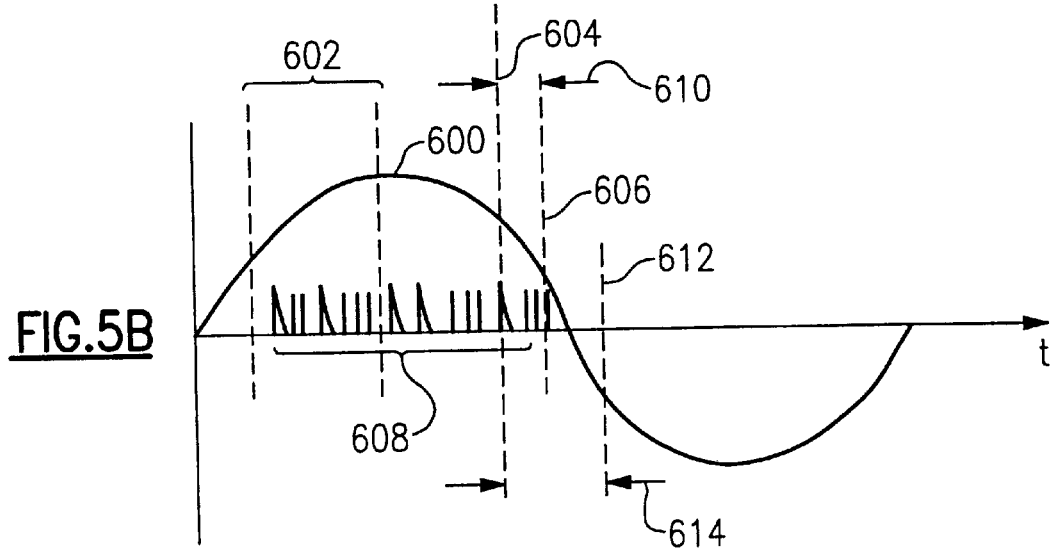
FIG. 5B shows two waveforms used in explaining an embodiment of the invention.

Referring to FIG. 5B, a power voltage sine wave 600 in the presence of arc fault di/dt pulses 608 is shown. An arc fault typically starts in a 30 degree to 90 degree range band 602 and lasts till near the next current zero cross shown at 606. The zero cross at 606 is the same as the voltage zero cross with resistive arc faults. As the arc nears the end of the current half wave zero cross, the arc becomes unstable and continues to produce detectable di/dt. In comparing the dimmer limit 506 in FIG. 5A with arc fault extinguish point 606 in FIG. 5B, a band 610 is established which contains arc fault di/dt but not dimmer di/dt. In this detection embodiment, the arc detector is preferably prevented from acquiring di/dt except in a band 614 extending from a predetermined time 604 (at the end of band 504 in FIG. 5A) shown in FIG. 5B to a predetermined time 612 which may include the current or voltage zero cross as shown here. The preferred time extends from approximately 150 degrees after the start of the first half wave cycle to approximately 30 degrees after the start of the subsequent half wave cycle. The reference for establishing the detection band 614 is preferably the line voltage half wave, but a sample of the current waveform may be used for this purpose.

Light dimmers, which are the primary load types which produce continuous di/dt, control only resistive light loads, i.e., without any power factor, and therefore the load current is in phase with the line voltage. Therefore, the line voltage can be used as the reference to establish band 614. For phase controllers (dimmers) controlling inductive loads, current half waves may be required as a reference to establish band 614, since phase shifting against the line voltage can occur which could shift a phase control di/dt pulse into the detection band 614, thus causing false arc detection. Typically di/dt generation in this case is suppressed by the load inductance, which causes low level di/dt which is easily discriminated by a di/dt pulse height level barrier. High current arc faults such as parallel faults across the load wires can produce power factors which cause current lag with respect to a voltage wave, but in this case the high current shifts the intense di/dt from the arcing into the voltage reference band 614 for a speedy detection.

Figure 6:
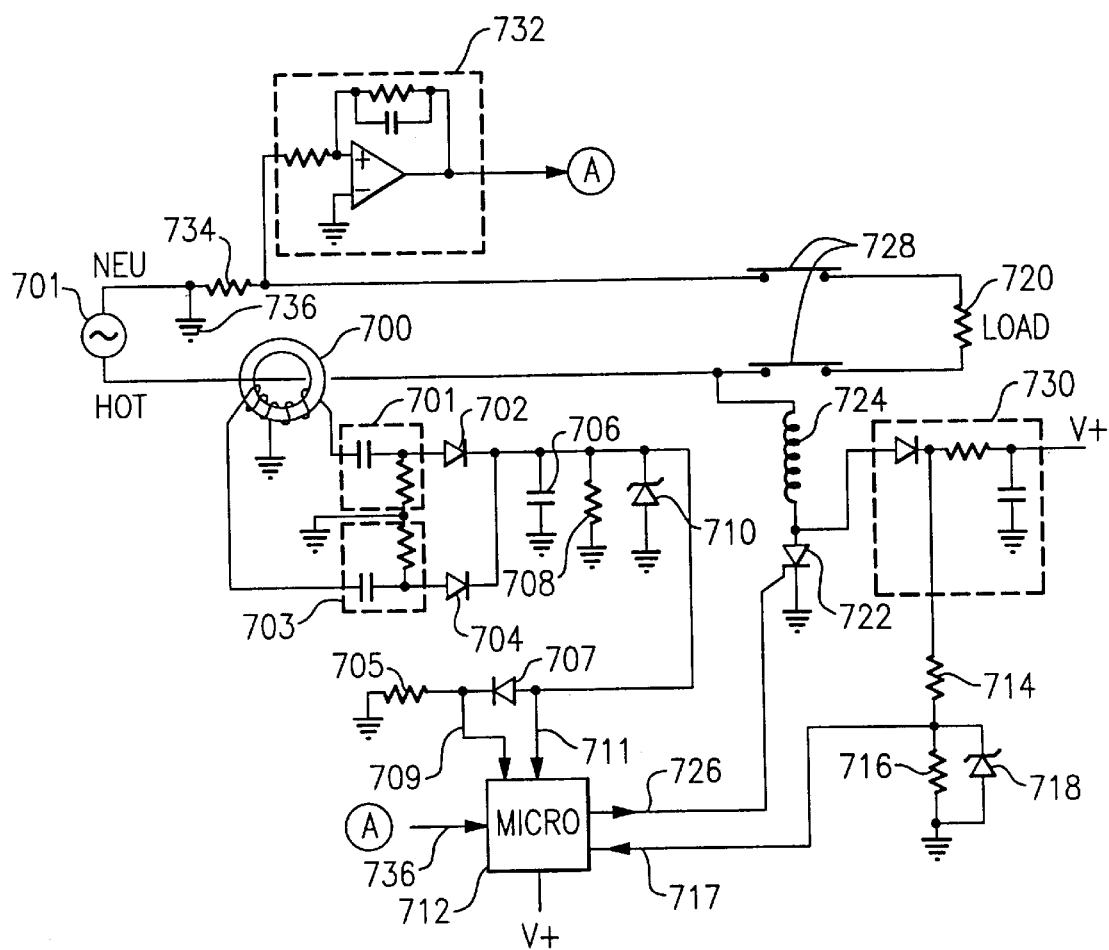
FIG. 6 shows a circuit which implements the embodiments of the invention.

Referring to FIG. 6, a circuit is shown which implements the above arc detection routines. A sensor 700 is a di/dt detector which detects steps in load current and is composed of a center-tapped winding, with high pass filters 701 and 703 connected across each winding segment to strip off low frequency 60Hz signals and harmonics from the sensor 700 output. In operation, a di/dt signal having positive voltage is produced by one or the other winding segment and transmitted through either rectifier 702 or 704, depending on which rectifier is forward biased. The di/dt pulses leaving diodes 702 or 704 are applied to an integrator capacitor 706 along with a discharge resistor 708. Integrator capacitor 706 rejects high frequency noise pulses, after which the di/dt signals are clamped by a Zener diode 710 to a logic level which is applied as an input 711 to a microprocessor 712.

A sample of the line voltage is taken from a voltage divider formed from resistors 714 and 716, connected across line 701 via a solenoid 724 and a power supply 730 for microprocessor 712. This stepped down voltage is clamped by a Zener 718 into a logic level pulse representing the width of a positive line voltage half wave and input into microprocessor 712 as an input 717. An output 726 of microprocessor 712 drives the gate of an SCR 722 to activate SCR 722, which then conducts line current through a solenoid 724, thereby releasing contacts 728 into the open state and disconnecting a load 720 from line 701.

Alternately, an op-amp circuit 732 amplifies the voltage across a small current viewing resistance 734, which voltage is proportional to the load current. Op-amp circuit 732 supplies a current half wave pulse to microprocessor 712 as an input 736, which can be used instead of the voltage half wave input 717 as a half wave reference.

Microprocessor 712 is preferably programmed in a straightforward way known to one skilled in the art to count the "N" di/dt pulses in any of the embodiments explained above, during the various required line cycle time intervals, which can be determined from either the voltage half wave sample or the current half wave sample. On satisfying the arc detection methods described above, microprocessor 712 issues a trip signal to SCR 722, which interrupts the arc fault when activated.

A preferable feature of the invention is a second di/dt input 709 to microprocessor 712, which input is one diode 707 drop below input 711. Using both inputs 711 and 709 sets up a hysteresis window between inputs 711 and 709. When advanced from full on, light dimmers produce a rising amplitude of di/dt pulses which may reach a level at a particular dimmer setting which causes intermittent detection of the di/dt pulse at input 711 to microprocessor 712. When microprocessor 712 senses a di/dt input at 711 but not at 709, the second counter is decremented away from the "M" value one count for every time a di/dt pulse is at one input but not the other. The count goes backward to zero, but not less than zero.

Another preferable feature is to increment a third counter to a predetermined value "P" in the presence of a detected input at 711 but not 709. The third counter count is checked by microprocessor 712 when the predetermined value "M" is reached, but before activating SCR 722. If the third counter has incremented to a value "P", then the second and third counters are reset to zero, or set back in predetermined ratios of "P" to "M", and the process of counting di/dt pulses starts over. This feature prevents microprocessor 712 from responding to di/dt pulses hovering near the detection amplitude of input 711 from dimmers, but not to the extent that arc fault di/dt pulses, which may also occasionally activate input 711 but not input 709, prevent microprocessor 712 from detecting arc faults. A current sense amplifier 732, which incorporates a low pass filter for rejecting di/dt but passing the 60 hz line fundamental and near harmonics, can also be used to detect a predetermined line current level above the protected circuit level, in which case the third counter is disabled for speedy arc fault detection.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. An arc fault protection device protecting a circuit on a power line, comprising:
   means for detecting di/dt pulses of load current steps, in which a first number of di/dt pulses occurring during a specified interval of a power wave is compared to a second number of di/dt pulses occurring in a subsequent interval of said power wave; and
   means for interrupting said circuit when a third number of times that said first number differs from said second number exceeds a first determined number in a window consisting of a second determined number of specified intervals of said power wave.

2. A device according to claim 1, wherein said interval is equal to one cycle.

3. A device according to claim 2, wherein a magnitude of said third number is used to increment a counter toward said first determined number in said window.

4. A device according to claim 3, wherein said first determined number is reset to zero when said window expires.

5. A device according to claim 3, further comprising means for determining which of said di/dt pulses of said load current steps are above a specified threshold, wherein said counter is decremented for every di/dt pulse that is below said threshold.

6. A device according to claim 3, further comprising means for determining which di/dt pulses of said load current steps are above a specified threshold, and wherein said means for interrupting includes means for determining, when said third number exceeds said second determined number within said window, when a fourth number of times that each di/dt pulse is below said threshold exceeds a third determined number, said first determined number and said fourth number are reset to zero.

7. A device according to claim 3, further comprising means for determining which di/dt pulses of said load current steps are above a specified threshold, and wherein said means for interrupting includes means for determining, when said third number exceeds said second determined number within said window, when a fourth number of times that each di/dt pulse is below said threshold exceeds a third determined number, said first determined number and said fourth number are decremented by a predetermined ratio of said third determined number to said first determined number.

8. A device according to claim 1, wherein said interval is equal to one half cycle.

9. A device according to claim 8, wherein a magnitude of said third number is used to increment a counter toward said first determined number in said window.

10. A device according to claim 9, wherein said first determined number is reset to zero when said window expires.

11. A device according to claim 9, further comprising means for determining which of said di/dt pulses of said load current steps are above a specified threshold, wherein said counter is decremented for every di/dt pulse that is below said threshold.

12. A device according to claim 9, further comprising means for determining which di/dt pulses of said load current steps are above a specified threshold, and wherein said means for interrupting includes means for determining, when said third number exceeds said second determined number within said window, when a fourth number of times that each di/dt pulse is below said threshold exceeds a third determined number, said first determined number and said fourth number are reset to zero.

13. A device according to claim 9, further comprising means for determining which di/dt pulses of said load current steps are above a specified threshold, and wherein said means for interrupting includes means for determining, when said third number exceeds said second determined number within said window, when a fourth number of times that each di/dt pulse is below said threshold exceeds a third determined number, said first determined number and said fourth number are decremented by a predetermined ratio of said third determined number to said first determined number.

14. A device according to claim 1, wherein said specified interval of said power wave and said subsequent interval of said power wave are of a same polarity.

15. A device according to claim 14, wherein a magnitude of said third number is used to increment a counter toward said first determined number in said window.

16. A device according to claim 15, wherein said first determined number is reset to zero when said window expires.

17. A device according to claim 15, further comprising means for determining which of said di/dt pulses of said load current steps are above a specified threshold, wherein said counter is decremented for every di/dt pulse that is below said threshold.

18. A device according to claim 15, further comprising means for determining which di/dt pulses of said load current steps are above a specified threshold, and wherein said means for interrupting includes means for determining, when said third number exceeds said second determined number within said window, when a fourth number of times that each di/dt pulse is below said threshold exceeds a third determined number, said first determined number and said fourth number are reset to zero.

19. A device according to claim 15, further comprising means for determining which di/dt pulses of said load current steps are above a specified threshold, and wherein said means for interrupting includes means for determining, when said third number exceeds said second determined number within said window, when a fourth number of times that each di/dt pulse is below said threshold exceeds a third determined number, said first determined number and said fourth number are decremented by a predetermined ratio of said third determined number to said first determined number.

20. A device according to claim 1, wherein a magnitude of said third number is used to increment a counter toward said first determined number in said window.

21. A device according to claim 20, wherein said first determined number is reset to zero when said window expires.

22. A device according to claim 21, further comprising means for determining which of said di/dt pulses of said load current steps are above a specified threshold, wherein said counter is decremented for every di/dt pulse that is below said threshold.

23. A device according to claim 21, further comprising means for determining which di/dt pulses of said load current steps are above a specified threshold, and wherein said means for interrupting includes means for determining, when said third number exceeds said second determined number within said window, when a fourth number of times that each di/dt pulse is below said threshold exceeds a third determined number, said first determined number and said fourth number are reset to zero.

24. A device according to claim 1, further comprising means for determining which di/dt pulses of said load current steps are above a specified threshold, and wherein said means for interrupting includes means for determining, when said third number exceeds said second determined number within said window, when a fourth number of times that each di/dt pulse is below said threshold exceeds a third determined number, said first determined number and said fourth number are decremented by a predetermined ratio of said third determined number to said first determined number.

25. A device according to claim 1, wherein said first determined number is reset to zero when said window expires.

26. A device according to claim 1, wherein said specified interval of said power wave extends from approximately 150 degrees after a start of a first half wave cycle to approximately 30 degrees after a start of a subsequent half wave cycle.

27. A device according to claim 26, wherein a magnitude of said third number is used to increment a counter toward said first determined number in said window.

28. A device according to claim 27, wherein said first determined number is reset to zero when said window expires.

29. A device according to claim 27, further comprising means for determining which of said di/dt pulses of said load current steps are above a specified threshold, wherein said counter is decremented for every di/dt pulse that is below said threshold.

30. A device according to claim 27, further comprising means for determining which di/dt pulses of said load current steps are above a specified threshold, and wherein said means for interrupting includes means for determining, when said third number exceeds said second determined number within said window, when a fourth number of times that each di/dt pulse is below said threshold exceeds a third determined number, said first determined number and said fourth number are reset to zero.

31. A device according to claim 27, further comprising means for determining which di/dt pulses of said load current steps are above a specified threshold, and wherein said means for interrupting includes means for determining, when said third number exceeds said second determined number within said window, when a fourth number of times that each di/dt pulse is below said threshold exceeds a third determined number, said first determined number and said fourth number are decremented by a predetermined ratio of said third determined number to said first determined number.

32. A method for protecting a circuit on a power line, comprising the steps of:
  detecting di/dt pulses of load current steps;
  comparing a first number of di/dt pulses occurring during a specified interval of a power wave to a second number of di/dt pulses occurring in a subsequent interval of said power wave; and
  interrupting said circuit when a third number of times that said first number differs from said second number exceeds a first determined number in a window consisting of a second determined number of specified intervals of said power wave.

* * * * *